US012622829B1

(12) United States Patent
Long

(10) Patent No.: US 12,622,829 B1
(45) Date of Patent: May 12, 2026

(54) SOFA WITH HYDRAULIC STAND ASSISTANCE DEVICE

(71) Applicant: Cody Long, Dallas, GA (US)

(72) Inventor: Cody Long, Dallas, GA (US)

(*) Notice: Subject to any disclaimer, the term of this patent is extended or adjusted under 35 U.S.C. 154(b) by 239 days.

(21) Appl. No.: 18/508,339

(22) Filed: Nov. 14, 2023

(51) Int. Cl.
*A61G 5/14* (2006.01)
*A47C 17/04* (2006.01)

(52) U.S. Cl.
CPC ................ *A61G 5/14* (2013.01); *A47C 17/04* (2013.01)

(58) Field of Classification Search
CPC .................................. A61G 5/14; A47C 17/04
See application file for complete search history.

(56) References Cited

U.S. PATENT DOCUMENTS 5,265,935 A 11/1993 Geisler
6,089,660 A 7/2000 Sproule
6,492,786 B1 * 12/2002 Vang ........................ A61G 5/14 5/616
7,455,360 B2 11/2008 White
D702,961 S 4/2014 Natuzzi
9,010,851 B2 4/2015 LaPointe
9,155,388 B2 10/2015 Robertson
9,561,146 B2 2/2017 Miller
9,795,528 B1 * 10/2017 Delmestri .............. A61G 5/104
10,888,169 B1 * 1/2021 Ma ....................... A47C 1/0355
2011/0289680 A1 * 12/2011 Sartisohn ................. A61G 5/14 5/83.1
2015/0282619 A1 * 10/2015 Lawson .............. A47C 1/0355 297/83

FOREIGN PATENT DOCUMENTS

WO 2012032305 3/2012

* cited by examiner

*Primary Examiner* — David R Dunn
*Assistant Examiner* — Tania Abraham

(57) ABSTRACT

The sofa with hydraulic stand assistance device is a therapeutic device. The sofa with hydraulic stand assistance device is adapted for use with a patient. The sofa with hydraulic stand assistance device is a mobility assistance device. The sofa with hydraulic stand assistance device assists the patient while sitting into and getting up from a chair. The sofa with hydraulic stand assistance device includes a chair structure, a hydraulic structure, and a control circuit. The hydraulic structure and the control circuit mount in the chair structure. The hydraulic structure provides the motive forces necessary to assist the patient in sitting into and getting up from the chair structure. The control circuit controls the operation of the hydraulic structure.

14 Claims, 6 Drawing Sheets

SOFA WITH HYDRAULIC STAND ASSISTANCE DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mobility assistance devices for standing and sitting.

SUMMARY OF INVENTION

The sofa with hydraulic stand assistance device is a therapeutic device. The sofa with hydraulic stand assistance device is adapted for use with a patient. The sofa with hydraulic stand assistance device is a mobility assistance device. The sofa with hydraulic stand assistance device assists the patient while sitting into and getting up from a chair. The sofa with hydraulic stand assistance device comprises a chair structure, a hydraulic structure, and a control circuit. The hydraulic structure and the control circuit mount in the chair structure. The hydraulic structure provides the motive forces necessary to assist the patient in sitting into and getting up from the chair structure. The control circuit controls the operation of the hydraulic structure.

These together with additional objects, features and advantages of the sofa with hydraulic stand assistance device will be readily apparent to those of ordinary skill in the art upon reading the following detailed description of the presently preferred, but nonetheless illustrative, embodiments when taken in conjunction with the accompanying drawings.

In this respect, before explaining the current embodiments of the sofa with hydraulic stand assistance device in detail, it is to be understood that the sofa with hydraulic stand assistance device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sofa with hydraulic stand assistance device.

It is therefore important that the claims be regarded as including such equivalent construction insofar as they do not depart from the spirit and scope of the sofa with hydraulic stand assistance device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
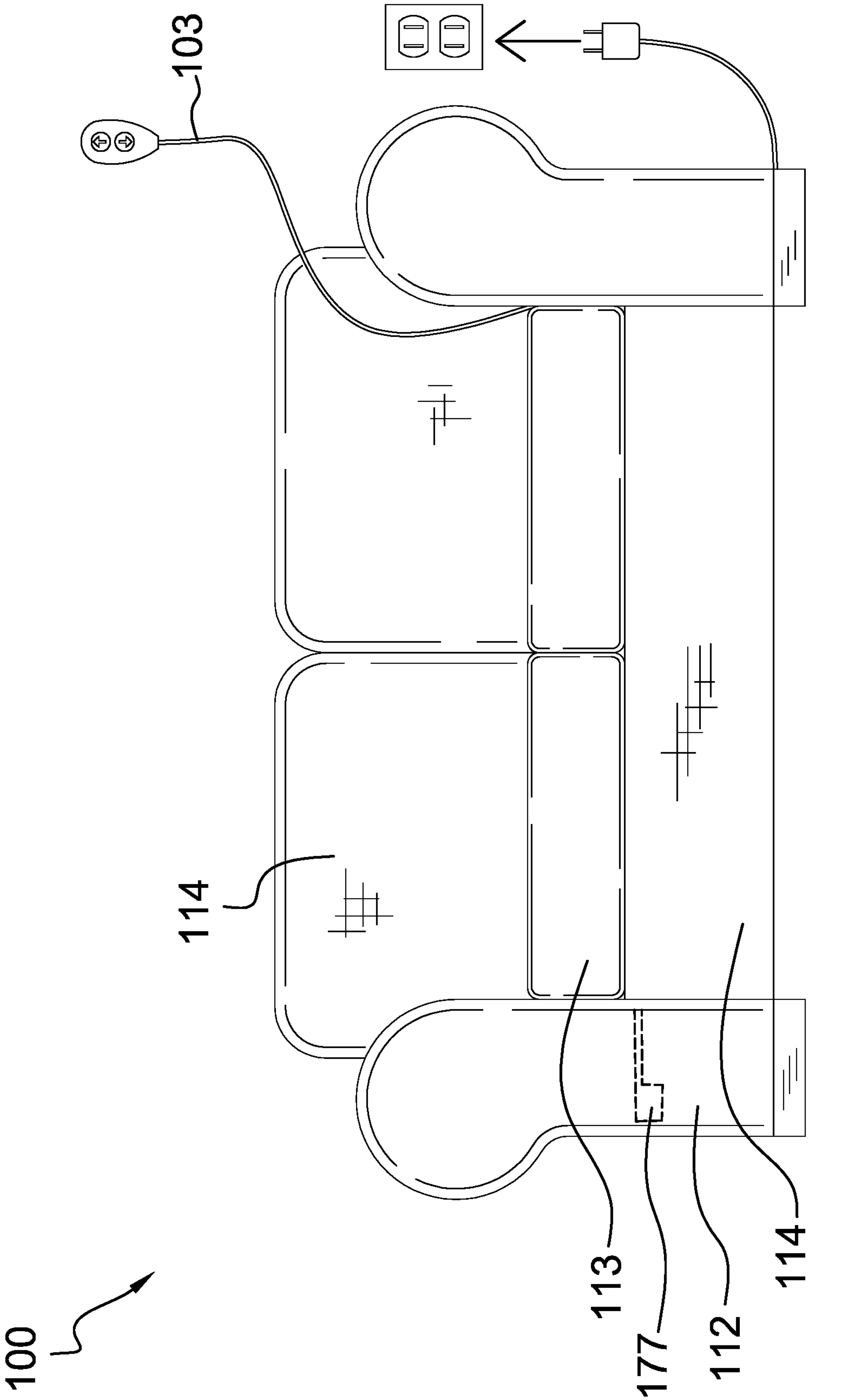
FIG. 1 is a front view of an embodiment of the disclosure.
Figure 2:
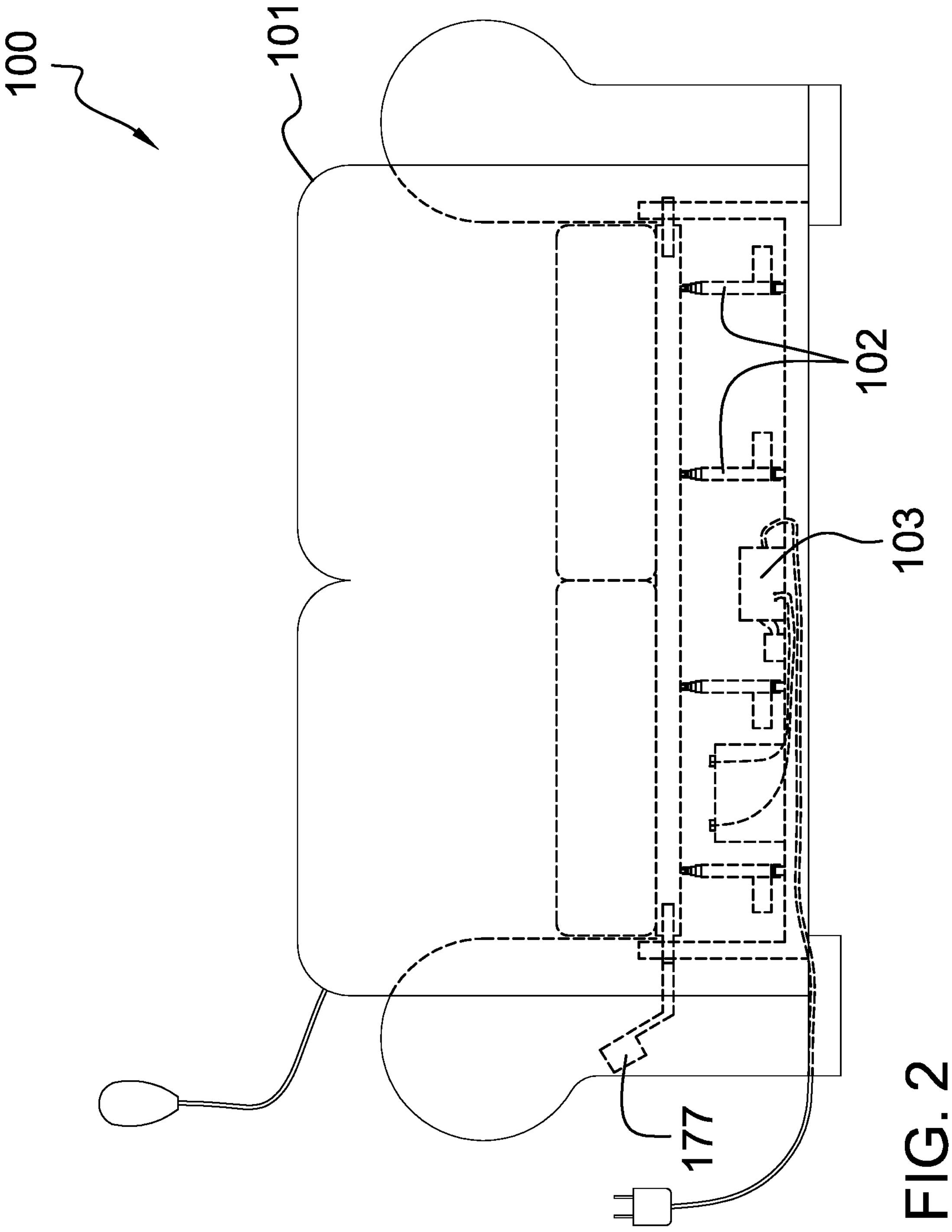
FIG. 2 is a rear view of an embodiment of the disclosure.
Figure 4:
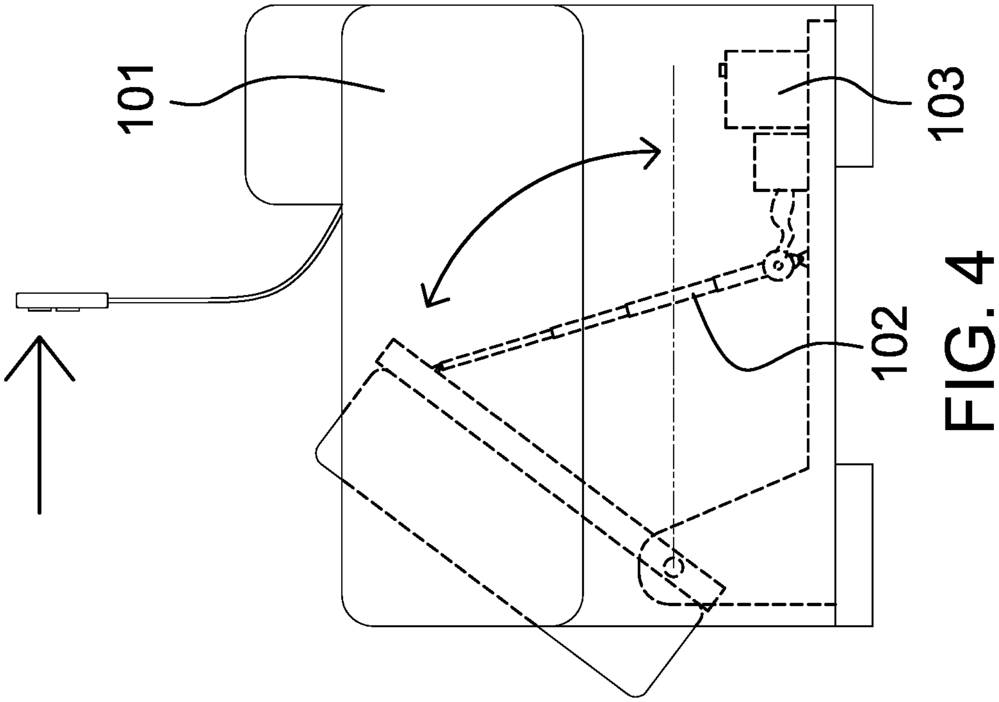
FIG. 4 is a reverse side view of an embodiment of the disclosure.
Figure 3:
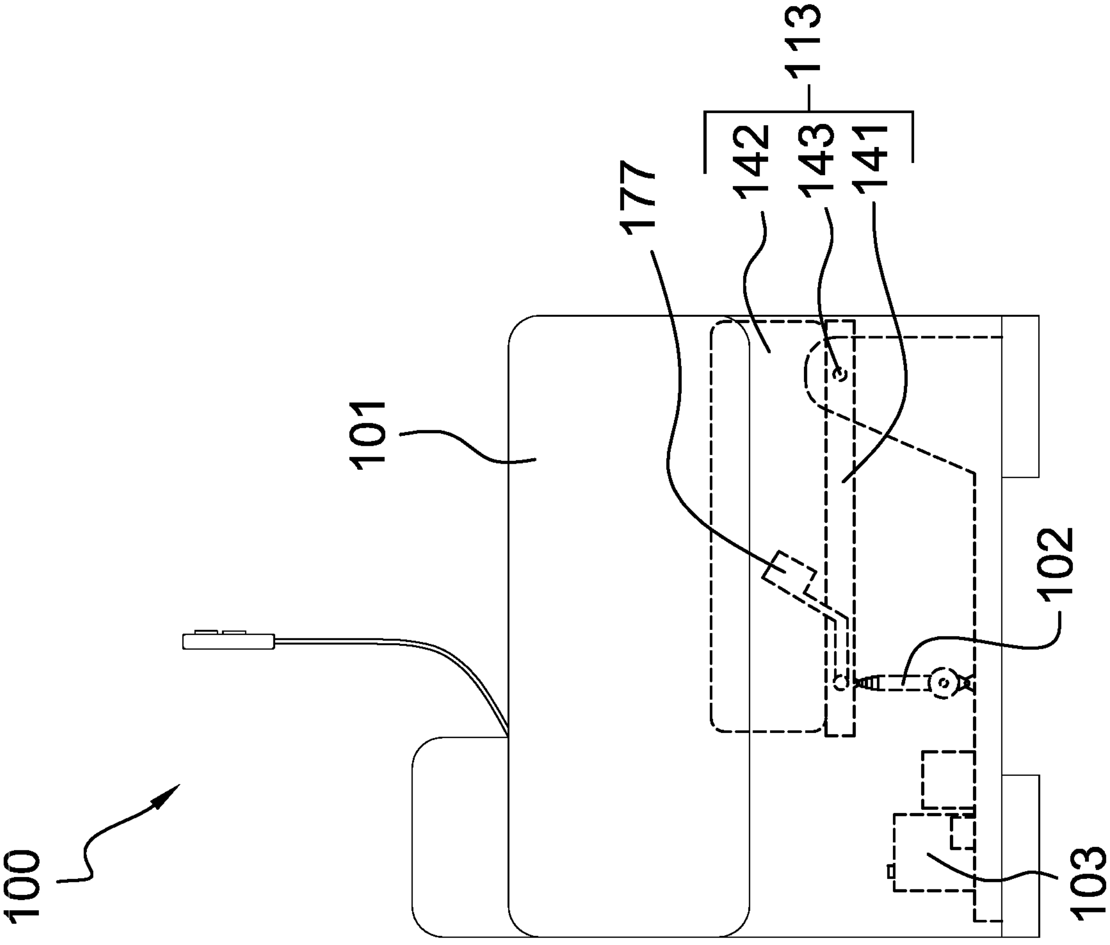
FIG. 3 is a side view of an embodiment of the disclosure.
Figure 5:
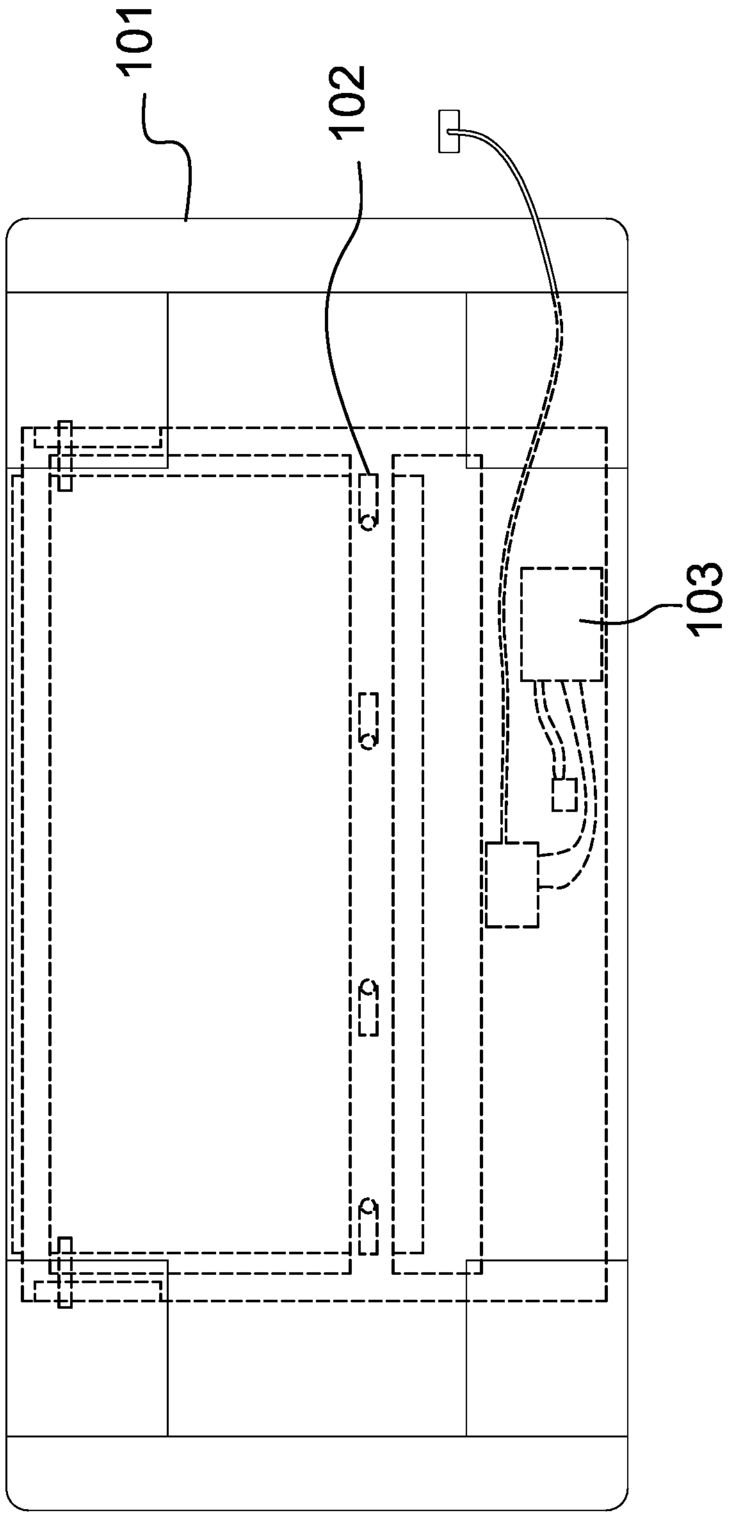
FIG. 5 is an inferior view of an embodiment of the disclosure.
Figure 6:
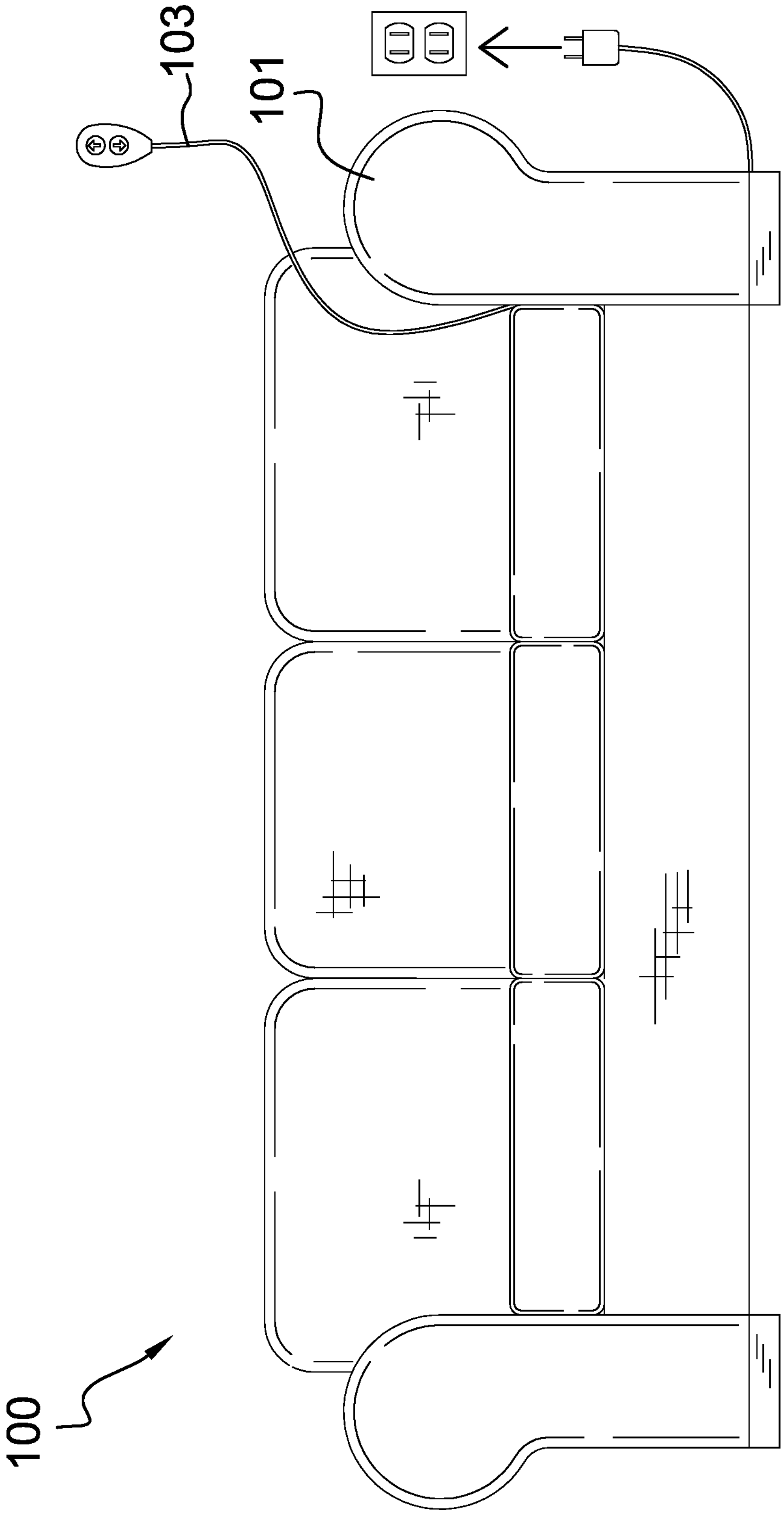
FIG. 6 is a front view of an embodiment of the disclosure.
Figure 7:
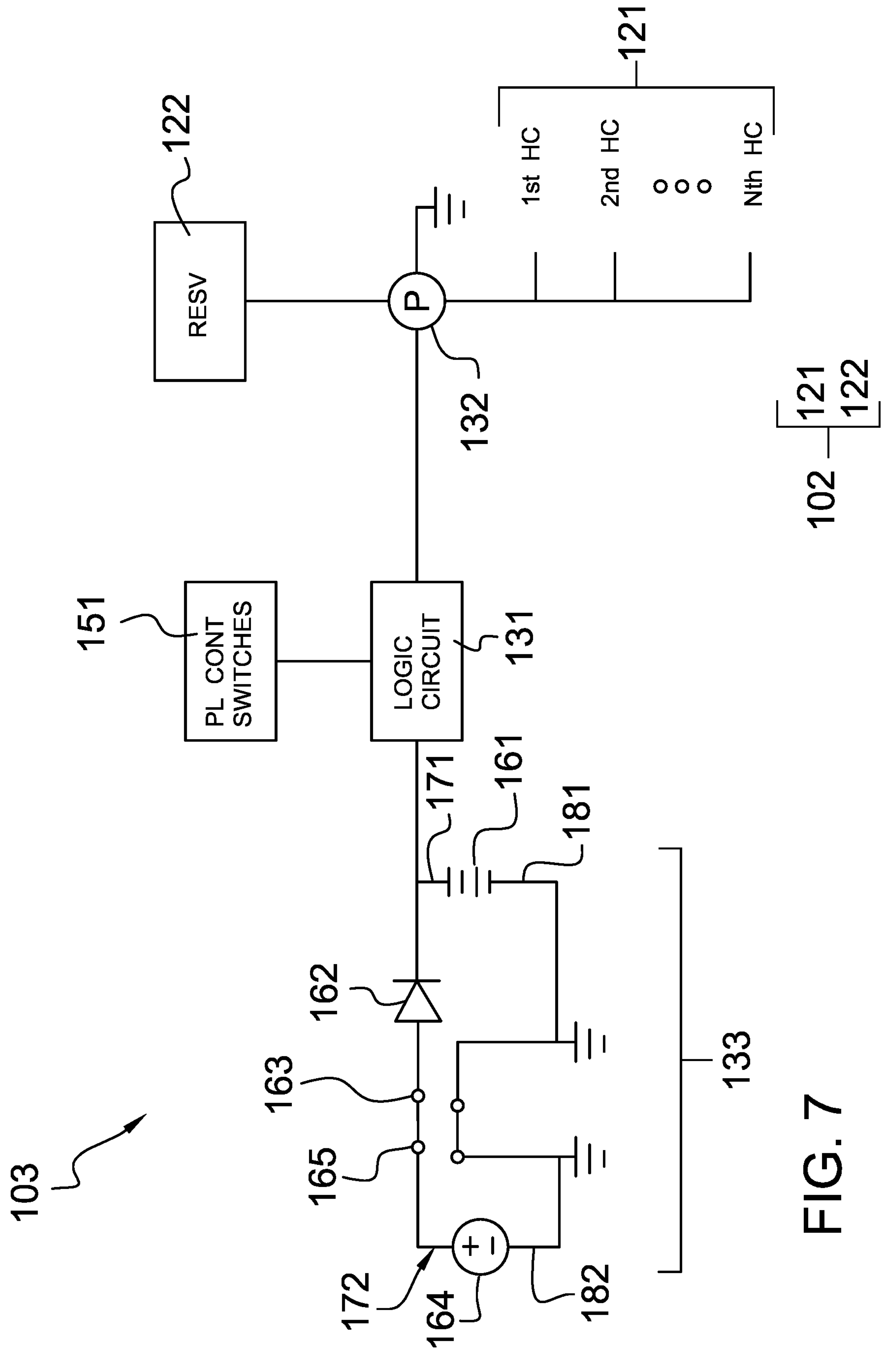
FIG. 7 is a schematic view of an embodiment of the disclosure.

Detailed reference will now be made to one or more potential embodiments of the disclosure, which are illustrated in FIGS. 1 through 7.

The sofa with hydraulic stand assistance device 100 (hereinafter invention) is a therapeutic device. The invention 100 is adapted for use with a patient. The invention 100 is a mobility assistance device. The invention 100 assists the patient while sitting into and getting up from a chair. The invention 100 comprises a chair structure 101, a hydraulic structure 102, and a control circuit 103. The hydraulic structure 102 and the control circuit 103 mount in the chair structure 101. The hydraulic structure 102 provides the motive forces necessary to assist the patient in sitting into and getting up from the chair structure 101. The control circuit 103 controls the operation of the hydraulic structure 102.

The chair structure 101 is a seat. The patient sits on the chair structure 101. The chair structure 101 comprises a backrest structure 111, a plurality of armrest structures 112, a bench structure 113, and a pedestal structure 114.

The backrest structure 111 forms the backrest of the chair structure 101. The backrest is defined elsewhere in this disclosure'. The plurality of armrest structures 112 form the 13 armrests of the chair structure 101. The armrest is defined elsewhere in this disclosure. The bench structure 113 forms the backrest of the chair structure 101. The bench is defined elsewhere in this disclosure. The pedestal structure 114 is a load bearing structure. The pedestal structure 114 elevates the backrest structure 111, the plurality of armrest structures 112, and the bench structure 113 above a supporting surface.

The pedestal structure 114 forms the final link of the load path that transfers the loads of the hydraulic structure 102, the control circuit 103, the backrest structure 111, the plurality of armrest structures 112, the bench structure 113, and the patient to a supporting surface.

The bench structure 113 further comprises a bench plate 141, a bench cushion 142, and a bench hinge 143.

The bench plate 141 is a disk shaped structure. The bench plate 141 is a rigid structure. The bench plate 141 is a load bearing structure. The bench plate 141 forms a horizontally oriented surface that supports the patient when the patient sits in the chair structure 101. The bench plate 141 is a rotating structure. The hydraulic structure 102 rotates the bench plate 141 when assisting the patient as the patient is sitting into and getting up from the chair structure 101.

The bench cushion 142 is a high viscosity polyurethane structure. The bench cushion 142 forms a cushion that protects the patient from the hard surfaces of the bench plate 141. The bench cushion 142 mounts on the superior congruent end of the disk structure of the bench plate 141.

The bench hinge 143 is a fastening device. The bench hinge 143 attaches the bench plate 141 to the pedestal structure 114. The bench hinge 143 is a rotating structure. The bench hinge 143 attaches the bench plate 141 to the pedestal structure 114 such that the bench plate 141 rotates relative to the pedestal structure 114. The hydraulic structure 102 attaches to the bench plate 141. The hydraulic structure 102 generates the motive forces necessary to rotate the bench plate 141 around the bench hinge 143.

The hydraulic structure 102 is a hydraulically powered device. The hydraulic structure 102 provides the motive forces that rotate the bench structure 113 of the chair structure 101 as the patient is sitting into and getting up from the chair structure. The hydraulic structure 102 forms a fluidic connection with the control circuit 103. The hydraulic structure 102 comprises a plurality of hydraulic structures 121 and a reservoir structure 122.

Each hydraulic structure selected from the plurality of hydraulic structures 121 is a hydraulic cylinder. Each selected hydraulic structure is a composite prism structure. Each selected hydraulic structure physically attaches the bench plate 141 of the bench structure 113 to the pedestal structure 114. Each selected hydraulic structure provides the motive forces that rotate the bench plate 141 of the pedestal structure 114 around the bench hinge 143. The control circuit 103 controls the operation of each selected hydraulic structure. The control circuit 103 controls the rotation of the bench plate 141 by controlling the span of the length of the center axes of the composite prism structure of each selected hydraulic structure. The control circuit 103 controls the span of the length of the center axis of each selected hydraulic structure by controlling the pressure of the hydraulic fluid within the selected hydraulic structure.

The reservoir structure 122 is a reservoir. The reservoir structure 122 contains the hydraulic fluid used to control the plurality of hydraulic structures 121. The control circuit 103 pumps the hydraulic fluid out of the reservoir structure 122 into the plurality of hydraulic structures 121 while assisting the patient in getting up from the chair structure 101. The reservoir structure 122 pumps the hydraulic fluid out of the plurality of hydraulic structures 121 into the reservoir structure 122 while assisting the patient in sitting into the chair structure 101.

The control circuit 103 controls the operation of the hydraulic structure 102. The control circuit 103 provides the hydraulic structure 102 with the energy necessary to place a hydraulic fluid under pressure. The pressurized hydraulic fluid provides the motive forces necessary to rotate the bench structure 113 as the patient is sitting into and getting up from the chair structure.

The control circuit 103 is an electric circuit. The control circuit 103 converts electric energy into the hydraulic pressure that operates the hydraulic structure 102. The control circuit 103 increases the pressure of the hydraulic fluid hydraulic structure 102 to assist the patient in getting up from the chair structure 101. The control circuit 103 decreases the pressure of the hydraulic fluid hydraulic structure 102 to assist the patient in sitting into the chair structure 101.

The control circuit 103 is an independently powered electric circuit. By independently powered is meant that the control circuit 103 can operate without an electrical connection to an external power source 164.

The control circuit 103 comprises a logic circuit 131, a pump structure 132, and a power circuit 133. The logic circuit 131, the pump structure 132, and the power circuit 133 are electrically interconnected. The pump structure 132 forms a fluidic connection with the hydraulic structure 102.

The logic circuit 131 is an electric circuit. The pump structure 132 electrically connects to the logic circuit 131. The logic circuit 131 controls the operation of the control circuit 103. The logic circuit 131 controls the operation of the pump structure 132. The logic circuit 131 causes the pump structure 132 to pump the hydraulic fluid from the reservoir structure 122 into the plurality of hydraulic structures 121. The logic circuit 131 further causes the pump structure 132 to pump the hydraulic fluid from the plurality of hydraulic structures 121 into the reservoir structure 122. The logic circuit 131 further comprises a plurality of control switches 151. The plurality of control switches 151 electrically connect to the logic circuit 131.

Each control switch selected from the plurality of control switches 151 is an electric switch. Each control switch selected from the plurality of control switches 151 electrically connects to the logic circuit 131. The logic circuit 131 monitors each control switch selected from the plurality of control switches 151. The logic circuit 131 receives the operating instructions from the plurality of control switches 151 that are necessary to assist the patient with sitting into and getting up from the chair structure 101.

The pump structure 132 is a mechanical structure. The pump structure 132 generates a pressure differential that is used by the logic circuit 131 to control the span of the length of the center axis of each hydraulic structure selected from the plurality of hydraulic structures 121. The pump structure 132 generates a first pressure differential in a first direction that pumps the hydraulic fluid from the reservoir structure 122 into the plurality of hydraulic structures 121. The pump structure 132 generates a second pressure differential in a first direction that pumps the hydraulic fluid from the plurality of hydraulic structures 121 into the reservoir structure 122. The pump structure 132 provides the hydraulic structure 102 with the motive forces necessary to rotate the bench plate 141 of the bench structure 113 of the chair structure 101 around the bench hinge 143.

The power circuit 133 is an electrical circuit. The power circuit 133 powers the operation of the control circuit 103. The power circuit 133 is an electrochemical device. The power circuit 133 converts chemical potential energy into the electrical energy required to power the control circuit 103. The power circuit 133 comprises a battery 161, a diode 162, a charging port 163, and an external power source 164. The battery 161 further comprises a first positive terminal 171 and a first negative terminal 181. The external power source 164 further comprises a charging plug 165, a second positive terminal 172, and a second negative terminal 182. The battery 161, the diode 162, the charging port 163, the external power source 164, and the charging plug 165 are electrically interconnected.

The battery 161 is an electrochemical device. The battery 161 converts chemical potential energy into the electrical energy used to power the control circuit 103. The battery 161 is a commercially available rechargeable battery 161. The chemical energy stored within the rechargeable battery 161 is renewed and restored through use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 171 of the rechargeable battery 161 into the second positive terminal 172 of the external power source 164.

It shall be noted that the invention 100 may include a manual lever 177. The manual lever 177 is optionally able to operate the hydraulic structure 102 in the event that the control circuit 103 is not operational (power loss, e.g.). The manual lever 177 would be able to control the output of the hydraulic structure 102 via linkages and a mechanical connection there between.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Armrest: As used in this disclosure, an armrest is a structure formed along a lateral side of a chair. The armrest forms a structure on which a person can place an arm.

Arc: As used in this disclosure, an arc refers to a portion of a circumference or a curved perimeter. When applied to an angle or cant, the arc also refers to a measure of an angular span as measured from a circle at the vertex formed by the sides of the angle.

Backrest: As used in this disclosure, a backrest is a vertical or vertically canted supporting surface formed along the posterior side of a chair. The backrest supports the back of a person sitting in the chair.

Battery: As used in this disclosure, a battery is a chemical device consisting of one or more cells, in which chemical energy is converted into electricity and used as a source of power. Batteries are commonly defined with a positive terminal and a negative terminal.

Bench: As used in this disclosure, a bench is a horizontal supporting surface formed by a chair.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Chair: As used in this disclosure, a chair is a structure that a person can sit on. The horizontal resting surface a person sits on is called the bench. Seat is a common synonym for a chair. A sofa refers to a chair that seats more than one person.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a pad or pillow formed from soft material that is used for resting, sleeping, or reclining. A cushion can also be used to prevent injury or damage.

Density: As used in this disclosure, density is a measured property of a compound that equals the mass of the compound divided by the volume of the compound. The term specific gravity is commonly used to compare the different densities of two different compounds. The specific gravity is calculated as the ratio of the two densities of the two different compounds.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

External Power Source: As used in this disclosure, an external power source is a source of the energy that is externally provided to enable the operation of the present disclosure. Examples of external power sources include, but are not limited to, electrical power sources and compressed air sources.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

High Viscosity Polyurethane: As used in this disclosure, a high viscosity polyurethane refers to an open cell polyurethane foam. The density and the viscosity of the of the open cell polyurethane foam is selected such that modulus of the open cell polyurethane foam decreases when the open cell polyurethane foam is exposed to body heat. The benefit of a high viscosity polyurethane structure is that the high viscosity polyurethane will mold itself to the contours of a body resting on the high viscosity polyurethane. The high viscosity polyurethane is used to make "memory" structures such as cushions.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure. The terms pneumatic and hydraulic can be used interchangeably. This disclosure assumes that: a) the use of hydraulic implies that the fluid is a liquid; and, b the use of pneumatic implies that the fluid is a gas.

Hydraulic Cylinder: As used in this disclosure, a hydraulic cylinder is a telescopic composite prism structure comprising an outer cylinder (or other tubular prism structure) and a matching piston structure. The piston structure mounts in the outer cylinder such that the position of the piston structure within the outer cylinder structure of the hydraulic cylinder is adjustable. The combination of the outer cylinder and the piston structure forms a reservoir within the hydraulic cylinder that contains a fluid, referred to as a hydraulic fluid. The reservoir forms a variable containment volume structure. The pressure of the hydraulic fluid contained within the reservoir varies as a function of the containment volume of the hydraulic cylinder. This arrangement allows for the adjustment of the piston position by applying an external force to change the pressure of the hydraulic fluid contained in the reservoir. Alternately, the pressure of the hydraulic fluid in the reservoir can be adjusted applying an external force to change the position of the piston structure within the outer cylinder.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Limited Arc Rotation: As used in this disclosure, a limited arc rotation refers the rotation of a structure that: a) has a regular cycle structure that regularly reverses the direction of rotation of the structure; and, b) has an arc of rotation of less than 360 degrees.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Logic Circuit: As used in this disclosure, a logic circuit is non-programmable electrical device that receives one or more digital or analog inputs and uses those digital or analog inputs to generate one or more digital or analog outputs. This disclosure assumes that the logic circuit is not a programmable device.

Maintained Switch: As used in this disclosure, a maintained switch is a switch that maintains the position that was set in the most recent switch actuation. A maintained switch works in an opposite manner to a momentary switch.

Modulus: As used in this disclosure, the modulus of an elastomeric material is a function that describes the percentage change in the span of the elastomeric material as a function of the force applied to elastomeric material. When comparing modulus, a larger modulus is taken to imply that an increase in force is required to get the same percentage change in the elastomeric material.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the “normal” position. For example, a “normally open” momentary switch interrupts (open) the electric circuit in the baseline position and completes (closes) the circuit when the momentary switch is activated. Similarly, a “normally closed” momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pad: As used in this disclosure, a pad is a disk-shaped mass of elastic material. A pad is often used: a) for protection against damage or injury; or b) grip security. Commonly used padding materials include, but are not limited to, polyurethane foam and silicone.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Patient: As used in this disclosure, a patient is a person who is designated to receive a medical treatment, therapy, or service. The term patient may be extended to an animal when used within the context of the animal receiving veterinary treatment or services.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a fluid.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Seat: As used in this disclosure, a seat is a structure that a person can sit on. Chair is a common synonym for a seat.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Therapeutic: As used in this disclosure, therapeutic is an adjective that refers to a medical, ameliorative, or hygienic substance, process, procedure, or device.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Viscosity: As used in this disclosure, viscosity refers to the resistance of a liquid or an elastic material to deformation. Higher viscosity would refer to a greater resistance to flow or to deformation. The term centipoise refers to the units of measurement of viscosity in a liquid. In this disclosure: a) a viscosity of greater that 80 centipoise is considered a high viscosity; and, b) a viscosity of greater than 2000 centipoise is considered a gel like viscosity.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A sofa with hydraulic stand assistance device comprising a chair structure, a hydraulic structure, and a control circuit;

wherein the control circuit controls the operation of the hydraulic structure;

wherein the hydraulic structure and the control circuit mount in the chair structure;

wherein the chair structure further comprises a backrest structure, a plurality of armrest structures, a bench structure, and a pedestal structure;

wherein the backrest structure forms a backrest of the chair structure;

wherein the plurality of armrest structures form the armrests of the chair structure;

wherein the bench structure forms a bench of the chair structure;

wherein the pedestal structure is a load bearing structure;

wherein the pedestal structure elevates the backrest structure, the plurality of armrest structures, and the bench structure above a supporting surface;

wherein the bench structure further comprises a bench plate, a bench cushion, and a bench hinge;

wherein the bench plate forms a horizontally oriented surface;

wherein the bench plate is a rotating structure;

wherein the hydraulic structure rotates the bench plate;

wherein the bench cushion mounts on the superior congruent end of the disk structure of the bench plate;

wherein the bench hinge attaches the bench plate to the pedestal structure;

wherein the bench hinge is a rotating structure;

wherein the bench hinge attaches the bench plate to the pedestal structure such that the bench plate rotates relative to the pedestal structure.

2. The sofa with hydraulic stand assistance device according to claim 1 wherein the sofa with hydraulic stand assistance device is a therapeutic device;

wherein the sofa with hydraulic stand assistance device is a mobility assistance device.

3. The sofa with hydraulic stand assistance device according to claim 2 wherein the pedestal structure forms the final link of the load path that transfers the loads of the hydraulic structure, the control circuit, the backrest structure, the plurality of armrest structures, and the bench structure to a supporting surface.

4. The sofa with hydraulic stand assistance device according to claim 3 wherein the bench plate is a disk shaped structure;

wherein the bench plate is a rigid structure;

wherein the bench plate is a load bearing structure;

wherein the bench cushion is a high viscosity polyurethane structure;

wherein the bench hinge is a fastening device.

5. The sofa with hydraulic stand assistance device according to claim 4 wherein the hydraulic structure attaches to the bench plate;

wherein the hydraulic structure generates the motive forces necessary to rotate the bench plate around the bench hinge;

wherein the hydraulic structure is a hydraulically powered device;

wherein the hydraulic structure provides the motive forces that rotate the bench structure;

wherein the hydraulic structure forms a fluidic connection with the control circuit.

6. The sofa with hydraulic stand assistance device according to claim 5 wherein the hydraulic structure comprises a plurality of hydraulic structures and a reservoir structure;

wherein the reservoir structure contains the hydraulic fluid used to control the plurality of hydraulic structures.

7. The sofa with hydraulic stand assistance device according to claim 6 wherein each hydraulic structure selected from the plurality of hydraulic structures is a hydraulic cylinder;

wherein each selected hydraulic structure is a composite prism structure;

wherein each selected hydraulic structure physically attaches the bench plate of the bench structure to the pedestal structure;

wherein each selected hydraulic structure provides the motive forces that rotate the bench plate of the pedestal structure around the bench hinge;

wherein the control circuit controls the operation of each selected hydraulic structure;

wherein the control circuit controls the rotation of the bench plate by controlling the span of the length of the center axes of the composite prism structure of each selected hydraulic structure;

wherein the control circuit controls the span of the length of the center axis of each selected hydraulic structure by controlling the pressure of the hydraulic fluid within the selected hydraulic structure.

8. The sofa with hydraulic stand assistance device according to claim 7 wherein the reservoir structure is a reservoir;

wherein the control circuit pumps the hydraulic fluid out of the reservoir structure into the plurality of hydraulic structures;

wherein the reservoir structure pumps the hydraulic fluid out of the plurality of hydraulic structures into the reservoir structure;

wherein the control circuit controls the operation of the hydraulic structure;

wherein the control circuit provides the hydraulic structure with the energy necessary to place a hydraulic fluid under pressure;

wherein the pressurized hydraulic fluid provides the motive forces necessary to rotate the bench structure.

9. The sofa with hydraulic stand assistance device according to claim 8 wherein the control circuit is an electric circuit;

wherein the control circuit converts electric energy into the hydraulic pressure that operates the hydraulic structure;

wherein the control circuit is an independently powered electric circuit;

wherein by independently powered is meant that the control circuit can operate without an electrical connection to an external power source.

10. The sofa with hydraulic stand assistance device according to claim 9 wherein the control circuit comprises a logic circuit, a pump structure, and a power circuit;

wherein the logic circuit, the pump structure, and the power circuit are electrically interconnected;

wherein the pump structure forms a fluidic connection with the hydraulic structure.

11. The sofa with hydraulic stand assistance device according to claim 10 wherein the logic circuit is an electric circuit;

wherein the pump structure electrically connects to the logic circuit;

wherein the logic circuit controls the operation of the control circuit;

wherein the logic circuit controls the operation of the pump structure;

wherein the logic circuit causes the pump structure to pump the hydraulic fluid from the reservoir structure into the plurality of hydraulic structures;

wherein the logic circuit further causes the pump structure to pump the hydraulic fluid from the plurality of hydraulic structures into the reservoir structure.

12. The sofa with hydraulic stand assistance device according to claim 11 wherein the logic circuit further comprises a plurality of control switches;

wherein the plurality of control switches electrically connect to the logic circuit;

wherein each control switch selected from the plurality of control switches is an electric switch;

wherein each control switch selected from the plurality of control switches electrically connects to the logic circuit;

wherein the logic circuit monitors each control switch selected from the plurality of control switches.

13. The sofa with hydraulic stand assistance device according to claim 12 wherein the pump structure is a mechanical structure;

wherein the pump structure generates a pressure differential that is used by the logic circuit to control the span of the length of the center axis of each hydraulic structure selected from the plurality of hydraulic structures;

wherein the pump structure generates a first pressure differential in a first direction that pumps the hydraulic fluid from the reservoir structure into the plurality of hydraulic structures;

wherein the pump structure generates a second pressure differential in a first direction that pumps the hydraulic fluid from the plurality of hydraulic structures into the reservoir structure;

wherein the pump structure provides the hydraulic structure with the motive forces necessary to rotate the bench plate of the bench structure of the chair structure around the bench hinge.

14. The sofa with hydraulic stand assistance device according to claim 13 wherein the power circuit is an electrical circuit;

wherein the power circuit powers the operation of the control circuit;

wherein the power circuit is an electrochemical device;

wherein the power circuit converts chemical potential energy into the electrical energy required to power the control circuit.

* * * * *